US008969764B2

(12) United States Patent
Peters (10) Patent No.: US 8,969,764 B2
(45) Date of Patent: Mar. 3, 2015

(54) APPARATUS AND METHOD FOR SHORT CIRCUIT WELDING WITH AC WAVEFORM

(75) Inventor: Steven R Peters, Huntsburg, OH (US)

(73) Assignee: Lincoln Global, Inc., City of Industry, CA (US)

(*) Notice: Subject to any disclaimer, the term of this patent is extended or adjusted under 35 U.S.C. 154(b) by 521 days.

(21) Appl. No.: 13/293,103

(22) Filed: Nov. 9, 2011

(65) Prior Publication Data

US 2013/0112675 A1 May 9, 2013

(51) Int. Cl.
*B23K 9/10* (2006.01)
*B23K 9/00* (2006.01)
*B23K 9/09* (2006.01)
*B23K 9/095* (2006.01)

(52) U.S. Cl.
CPC .............. *B23K 9/093* (2013.01); *B23K 9/0953* (2013.01); *B23K 9/1062* (2013.01)
USPC ..................................... 219/130.51; 219/136

(58) Field of Classification Search
USPC ......... 219/130.1–130.51, 136, 137 R, 137 PS
See application file for complete search history.

(56) References Cited

U.S. PATENT DOCUMENTS

| | | | |
|---|---|---|---|
| 3,461,264 A | 8/1969 | Sims et al. | |
| 3,777,103 A | 12/1973 | White et al. | |
| 3,947,655 A | 3/1976 | Gonzalez et al. | |
| 4,020,320 A | 4/1977 | Pijls et al. | |
| 4,149,063 A | 4/1979 | Bishel | |
| 4,469,933 A | 9/1984 | Mizuno et al. | |
| 4,485,293 A | 11/1984 | Tabata et al. | |
| 4,544,825 A | 10/1985 | Cook | |
| 4,658,112 A | 4/1987 | Thompson | |
| 4,665,299 A | 5/1987 | Iwata et al. | |
| 4,717,807 A | 1/1988 | Parks et al. | |
| 4,785,149 A | 11/1988 | Gilliland | |
| 4,866,247 A | 9/1989 | Parks et al. | |
| 4,877,941 A | 10/1989 | Honma et al. | |
| 4,897,523 A | 1/1990 | Parks et al. | |
| 4,972,064 A | 11/1990 | Stava | |
| 5,001,326 A | 3/1991 | Stava | |
| 5,003,155 A | 3/1991 | Chai et al. | |
| 5,059,765 A | 10/1991 | Laing | |
| 5,061,810 A | 10/1991 | Ramachandran | |
| 5,148,001 A | 9/1992 | Stava | |
| 5,676,857 A | 10/1997 | Parker | |
| 5,686,002 A | 11/1997 | Flood et al. | |
| 5,961,863 A | 10/1999 | Stava | |
| 6,051,810 A | 4/2000 | Stava | |
| 6,215,100 B1 * | 4/2001 | Stava | ....................... 219/130.51 |

FOREIGN PATENT DOCUMENTS

| | | |
|---|---|---|
| JP | 09225639 A | 9/1997 |
| JP | 11129069 A | 5/1999 |
| JP | 3297569 B2 | 7/2002 |

OTHER PUBLICATIONS

European Search Report in European Application No. 99118592, mailing date Mar. 17, 2000.

* cited by examiner

*Primary Examiner* — Sang Y Paik
(74) *Attorney, Agent, or Firm* — Perkins Coie LLP (57) ABSTRACT

A system and method is provided in which a surface tension transfer welding function is employed where the welding waveform switches polarity during welding when a short circuit event is detected.

21 Claims, 6 Drawing Sheets

APPARATUS AND METHOD FOR SHORT CIRCUIT WELDING WITH AC WAVEFORM

BACKGROUND OF THE INVENTION

1. Field of the Invention

Devices, systems, and methods consistent with the invention relate to welding, and more specifically to devices, systems and methods for short circuit welding with an AC waveform.

2. Incorporation by Reference

The present invention generally relates to improvement in spatter and heat input in welding systems of the general type described in each of U.S. Pat. Nos. 4,972,064 and 6,215,100, the entire disclosures of which are incorporated herein by reference in their entirety.

3. Description of the Related Art

Various short circuit welding methodologies are known in which at least some of the metal transfer from a welding electrode to the work piece occurs when a short circuited state is present. Furthermore, the use of AC welding waveforms is generally known and is often used to reduce heat input into a work piece as the heat input is reduced during the negative portion of a welding waveform. However, in certain applications known short circuit and AC welding applications still have limitations. Accordingly, an improved welding methodology incorporating these features is needed.

BRIEF SUMMARY OF THE INVENTION

An exemplary embodiment of the present invention is a short circuit welding power supply with a switching power supply which provides a welding current waveform to at least one workpiece to be welded. The welding current waveform comprises a plurality of welding cycles and each of the welding cycles comprises at least an arc portion and a shorting portion which is initiated after the detection of a short circuit between an electrode and the at least one workpiece. The power supply has a controller which controls an output of the switching power supply such that the welding current waveform comprises a plurality of first waveform portions and a plurality of second waveform portions. Each of the first and second waveform portions of the welding current waveform comprises a plurality of the welding cycles and all of the current output by the switching power supply during the first portions has a first polarity, and all of the current output by the switching power supply during the second portions has a second polarity, which is opposite of the first polarity. The controller switches the current output of the switching power supply between the first and second polarities only when a short circuit detection event is detected during welding, and the controller switches between the first and second polarities before the short detection event is cleared by the shorting portion of the cycle which immediately follows the short circuit detection event.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Figure 1:
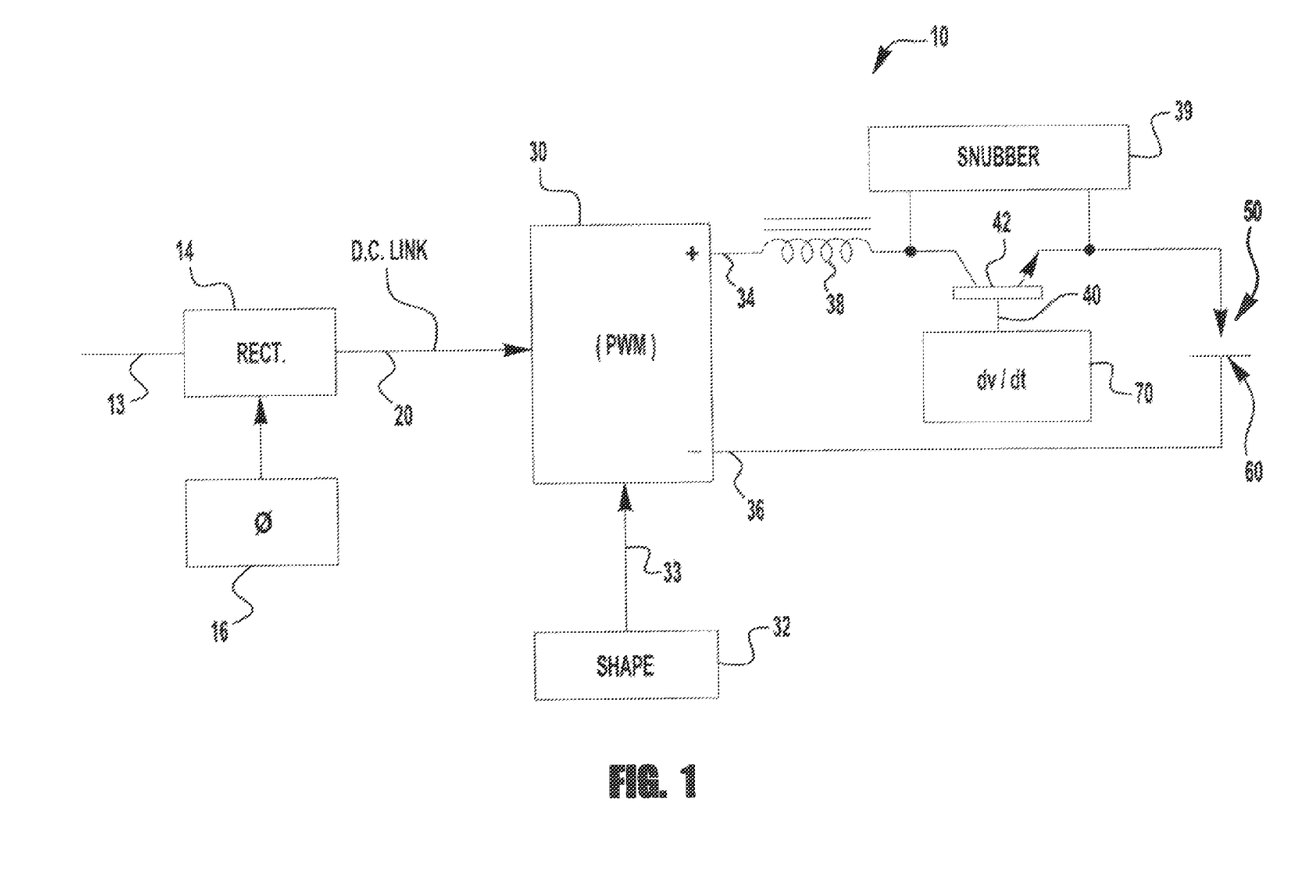
FIG. 1 illustrates a diagrammatical representation of a basic weld system that can be utilized incorporating an exemplary embodiment of the present invention.

Referring now to the drawings wherein the showings are for the purpose of illustrating the preferred embodiment of the invention only and not for the purpose of limiting same, FIG. 1 illustrates a short circuiting arc welding system connected to the output of a DC power supply. In an exemplary embodiment of the present invention, the type of welding is short circuiting welding, and more specifically is surface-tension-transfer, or STT, type of welding. Exemplary embodiments of a welding circuit and control arrangement for such types of welding are disclosed in U.S. Pat. Nos. 4,972,064 and 6,215,100, which are both incorporated herein by reference in their entirety. Accordingly, only a general discussion of the welding circuit will be discussed below.

The power supply 10 is a welding power supply which receives an AC current 13, whether it is from a utility or from a generator. The AC current 13 is then rectified by rectifier 14 to form a DC current 20. A phase controller 16 controls the rectifier 14 to produce a substantially uniform DC current 20. DC current 20 is then directed into a pulse width modulator 30. The shapes of the pulse are controlled by shaping circuit 32 to thereby create a desired pulse with the DC current 20 through output terminals 34, 36. As can be appreciated, the power supply need not be a rectified output but can be any other appropriate DC source. Furthermore, the power supply 100 can be configured like a switch-mode or inverter-type power supply utilizing boost, buck, buck-boost or interleaved buck-boost circuit which creates a constant voltage DC bus, from which the output or welding signal is created. Embodiments of the present invention are not limited in this regard. In the embodiment shown, the DC current from the pulse width modulator 30 is directed across a welding area which includes a consumable 50 and workpiece 60.

Figure 2:
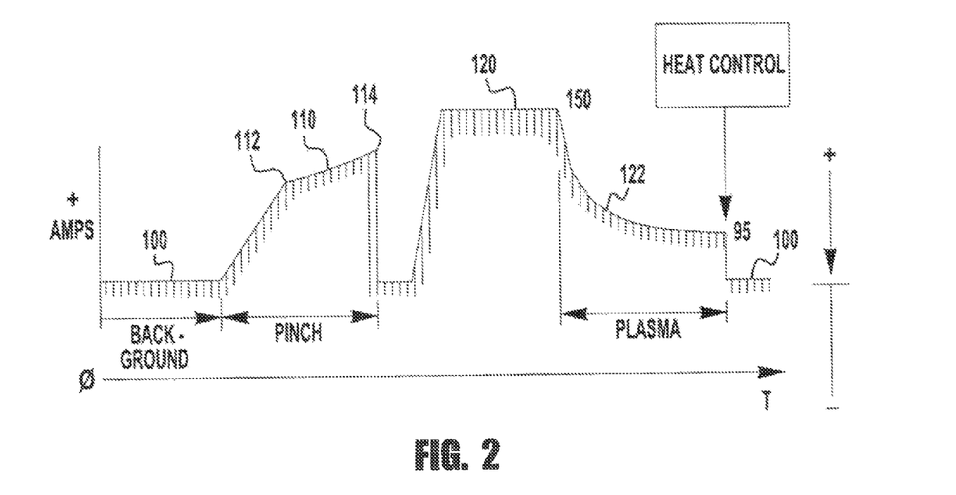
FIGS. 2 and 3 illustrate a diagrammatical representations of single current welding cycle profiles—both positive and negative—employed in a system or method of an exemplary embodiment of the present invention.
Figure 3:
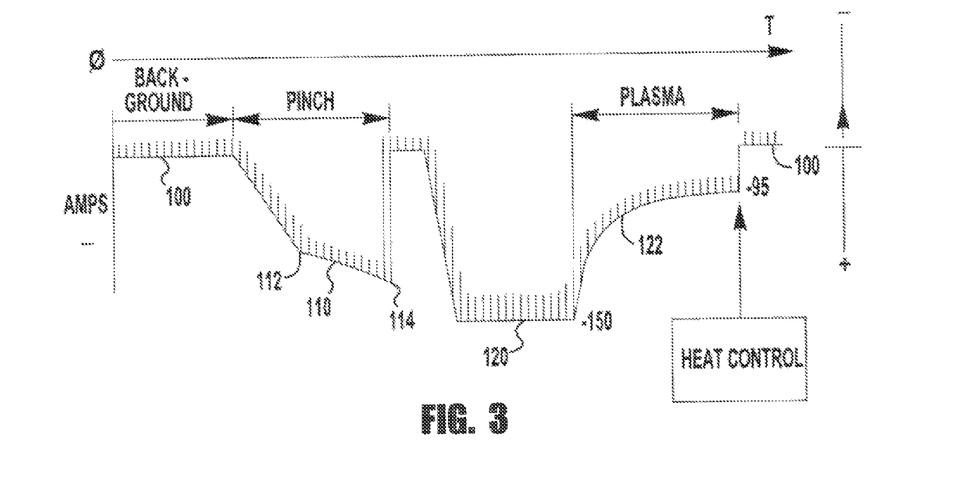

As occurs in surface tension transfer welding, the workpiece 60 and electrode 50 alternate between a short circuit condition when the electrode 50 engages workpiece 60 and an arcing condition where the electrode 50 is spaced from the workpiece 60. During the arcing condition, an electric arc is created between the workpiece 60 and the electrode 50 for purposes of melting and maintaining molten the end of the electrode as it is fed toward the workpiece for a subsequent short circuit condition. An exemplary embodiment of this type of welding cycle is schematically illustrated in FIGS. 2 and 3. As shown these figures, the welding cycle alternates between a short circuit condition and a plasma condition.

In the depicted embodiments, during the plasma condition an arc is created and maintained at all times to provide effective welding. The welding cycle is repeated several times per second and is accurately controlled for the purpose of reducing spatter at various times during the welding cycle. Accordingly, the pulse width modulator 30 operates at a high frequency. In an exemplary embodiment, the operating frequency of the pulse width modulator controller 30 is 20 kHz with a width of the successive current pulse being determined by the voltage on line 33 from shape controller 32. In another exemplary embodiment of the present invention, the operating frequency of the controller is up to 120 kHz. As the feedback control system demands more current in the welding cycle, a higher voltage appears on line 33 causing a wider pulse during the next pulse from the pulse width modulator 30. Thus, the demanded current for the welding cycle is changing approximately 220,000 times each second. Since the highest rate of the welding cycle is generally 100 to 400 cycles per second, many update pulses are provided during each welding cycle. Also in the embodiment shown, the system 10 includes a premonition circuit 70 having an output line 40 for controlling switch 42.

During welding, the system 10 directs current to the work area in accordance with the operation of the pulse width modulator controller 30 until the dr/dt (where r is the electrode resistance), di/dt or dv/dt indicates an upcoming fusing or shorting event during the pinch cycle. When this detection occurs, the logic on line 40 changes polarity to open switch 42. This places the resistor or snubber 39 in series with main choke 38. Since the main choke 38 has a small inductive reactance, very little energy is stored in the welding current circuit. Consequently, the current flow caused by the welding circuit between the electrode and the workpiece is immediately dropped to a level determined by resistor 39. Furthermore, in exemplary embodiments of the present invention the resister 39 can aid in setting the background current. For example, if the open circuit voltage of the power source 10/200 is 70 volts and the resister 39 is 1.5 ohms, the background current will be at 45 amps. Thus, the selection of the resister 39 can aid in defining and controlling at least the background current.

In accordance with embodiments of the present invention, there is added to the welding current circuit a generally parallel background current circuit. The background current circuit continues to provide a background level of current (for example, 5 to 7 amps) across the workpiece irrespective of the operating condition of the welding circuit. As a result, the background current can insure that at least some current passes between the electrode and the workpiece at all times during the welding cycle, thereby preventing the extinguishment of the arc between the electrode and the workpiece during the welding cycle.

Referring now to FIGS. 2 and 3, each of which depict exemplary embodiment of welding cycles that are implemented with embodiments of the present invention. FIG. 2 depicts the waveform with a positive polarity while FIG. 3 depicts the waveform with a negative polarity. The waveform in FIG. 2 shows a current profile to produce low spatter and to prevent the weld bead from passing through a gap between welding workpieces. The current profile is divided into a pinch portion, a plasma boost portion, a plasma portion and a background portion where the arc is to be maintained. In the current profile, the pinch portion 110 includes a break point 112 and a premonition circuit operating point 114. The plasma boost portion 120 of the current profile includes a decaying portion 122 referred to as the plasma portion. The plasma boost portion 120 is the constant current portion prior to the decay portion 122. However, the decaying portion 122 can be referred to as the end of the plasma boost portion 120 or the start of the plasma portion. Following the decaying portion 122, the current control circuit shifts to the background current level 100 which maintains the plasma or arc during a background state. As shown in this figure, for this portion of the welding waveform the entire cycle has a single polarity (positive in FIG. 2). In exemplary embodiments of the present invention, during the positive portion of the welding process (which will be discussed more fully below) the background current level is preselected and maintained between cycles, thereby preventing the current level through the arc from ever falling below the background current level and allowing the arc to extinguish.

The current control circuit is designed to produce all the melting of the electrode during the plasma boost and plasma portion of the welding cycle. Further melting of electrode 50 does not appreciably take place when the background current level 100 occurs since the IR necessary for melting the electrode is not obtainable through an arc maintained only by the background current. Thus, the background current only serves to maintain the arc and the ball of molten metal from the electrode 50 in the molten state. The amount of molten metal at the end of electrode 50 which is formed by the plasma boost and plasma is selected to melt a volume of molten metal at the end of the electrode, and the plasma portion of the current is reduced to the background current once the volume is obtained. The duration of the plasma boost and plasma portion is also selected to prevent unnecessary melting of the workpiece metal in the weld zone, during welding. Such over-melting of the workpiece can result in excessive heat input and/or having portions of the workpiece(s) penetrate areas of the weld joint in which it is not desirable to have molten metal. During the formation of the molten metal ball at the end of the electrode 50 during the plasma portion of the current, the jet forces of the high current repel the melted metal from the welding pool until an amount of molten metal has been melted at the end of the electrode 50. Once the current is reduced, the molten metal is allowed to form into a ball and the molten metal pool in the weld joint is allowed to stabilize, thereby allowing for a smooth contact between the melted electrode ball and the weld metal pool. In exemplary embodiments of the invention, the desired amount of molten metal at the end of the electrode 50 is controlled by directing a preselected amount of energy or wattage into the electrode during the plasma portion of the welding cycle.

Once the molten metal ball is formed during the plasma boost and the plasma portion of the welding cycle, the molten ball is forced into the molten pool by feeding the electrode 50 into the pool, thereby forming a short circuit condition. When the melted metal ball engages the molten metal pool, it is transferred into the pool by surface tension. This action causes an ultimate necking down of the molten metal extending between the pool and the wire in the electrode 50, and then a rupture and separation of the ball from the wire 50 occurs. Since there is only a low background current during the separation, little if any spatter occurs. In an exemplary embodiment, the current control circuit monitors the necking of the molten metal ball such that when the neck rapidly reduces in diameter, the current flow during the pinch curve 110 increases more gradually until a detection of an impending fuse is obtained. Once the detection of an impending fuse occurs, the current is reduced to the background current until the molten metal at the end of the electrode transfers into the weld pool.

FIGS. 2 and 3 each depict an exemplary embodiment of a surface tension transfer short circuit welding cycle with the cycle in FIG. 2 applying the positive terminal to the advancing wire 50. In FIG. 3, the opposite polarity is shown with the electrode 50 being negative and the workpiece 60 being positive.

Figure 4:
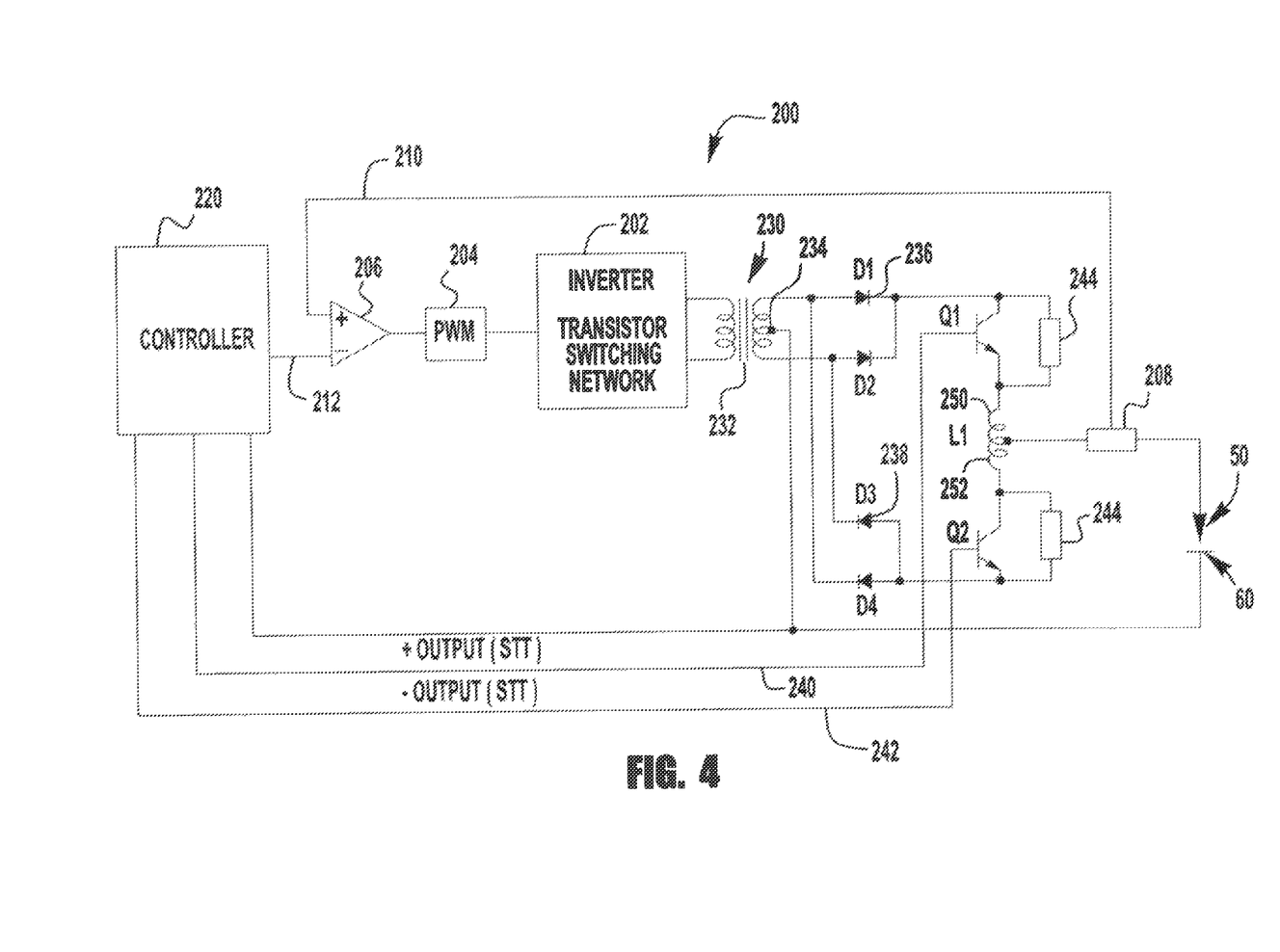
FIG. 4 illustrates a diagrammatical representation of a further system which can be used to implement an exemplary embodiment of the present invention.

Another exemplary embodiment of the present invention is shown in FIG. 4. In this figure, the system 200 applies a welding pulse across the advancing cord metal electrode 50 as the electrode or wire moves toward workpiece 60. The system 200 includes a switching type power supply 202 in the form of an inverter having switching pulses controlled by pulse width modulator 204 with the width of the successive current pulses determined by the voltage at the output of error amplifier 206. This amplifier receives a voltage from current shunt 208 that is proportional to the actual arc current. Input line 210 directs the current voltage to the amplifier with the desired current signal in line 212 from the controller 220. Controller 220 creates a voltage in line 212 that sets the width of the individual rapidly occurring current pulses at the output of inverter or power supply 202. Output stage 230 of inverter 202 includes a transformer 232 having center tap 234 connected to a positive rectifier 236 and a negative rectifier 238. A polarity selector in controller 220 provides logic in output 240 when the output of the power supply is to have a positive polarity and logic in output line 242 when the power supply is to be shifted into a negative polarity. Switches Q1, Q2, each having an active snubber 244, are used to control current in inductor L1 having a positive polarity portion 250 controlled by switch Q1 and a negative polarity portion 252 controlled by switch Q2. A logic in line 240 closes switch Q1 causing current flow through inductor portion 250. Logic in line 242 changes the polarity causing current flow in negative polarity portion 252 of inductor L1. So long as the polarity is positive by the logic in line 240, the system 200 produces positive current pulses to give the positive polarity current cycle shown in the beginning portion of FIG. 5.

Figure 5:
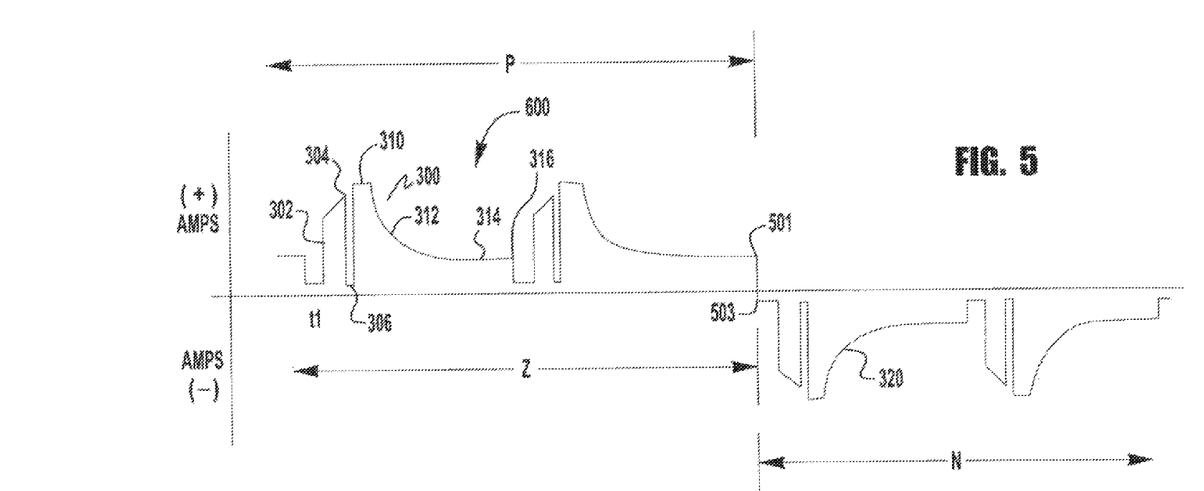
FIG. 5 illustrates a diagrammatical representation of an exemplary welding waveform which can be used with embodiments of the present invention.

As shown in FIG. 5, the welding waveform 600 is shown having a positive portion P with all current in this portion P having a positive polarity. It is noted that for purposes of clarity the beginning portion of the positive portion P is not but extends to the left of the portion P shown in FIG. 5. As shown, each cycle 300 of the waveform 600 has a starting point at t1 which is generally at the time a short occurs. The background current 314 drops toward zero. Thereafter, the pinch current 302 causes the shorted metal ball from the electrode 50 to transfer by a tension transfer and an electrical pinch is created such that the electrode 50 begins to neck down above the ball, as indicated at 304. At this point, the current is again dropped as indicated at portion 306 to reduce spatter. After the metal has been transferred by the electric pinch action, the plasma condition is reestablished by a plasma boost pulse 310 having a maximum arc current. The area of the plasma boost pulse 310 determines the general size of the molten metal ball at the end of the advancing wire electrode 50. After the boost pulse, the current has a time constant tailout 312 terminating at the background current 314. At 316 the next short circuit occurs. As long as logic 1 appears in output 240 the rapidly created current pulses have a positive polarity, as shown in FIG. 5.

However, upon receipt of logic one in output line 242, the polarity of the welding operation is reversed. A reversed or negative polarity cycle 320 is created, as shown in FIG. 5. In exemplary embodiments of the present invention, the controller 220 of the system 200 triggers the changing of polarity to only occur when a short has been detected. As shown in FIG. 5, this event occurs at point 501 when a short circuit is detected between the electrode 50 and the workpiece 60. In prior systems, the reversal of polarity occurred either during the background current or during the boost or plasma phase of the cycles 300/320. the changing of polarity during these portions of the waveform can create difficulties in restarting the welding arc as the current transitions past and through 0 amps when it is reversing polarity. Because of this, in prior systems a significant amount of voltage is needed to re-establish the arc. However, in embodiments of the present invention the polarity is changed only after the short has been detected and before the short is broken. Specifically, embodiments of the present invention, detect the short occurring in a first polarity, change the welding waveform polarity and then initiate the short clearing pulse in the opposite polarity. This is generally shown in FIG. 5.

As shown in FIG. 5, the welding waveform is welding in a positive pulse mode P. After a duration Z, the system 200 detects the existence of another shorting event at point 501. At this point the controller 220 causes the polarity of the waveform to shift (as described above) from positive to negative. Once the polarity is reversed, then the controller 220 initiates the short clearing operation as described above, at 503. After this first short is cleared in the opposite polarity then the welding waveform proceeds as described above but in the opposite polarity, during a negative portion N of the waveform 600. Again, for purposes of clarity the end of the negative portion N of the waveform is not shown but extends to the right of FIG. 5.

During welding, the controller 220 monitors at least one of a duration Z of each of the positive and negative portions P/N, and/or a number of detected shorts (for example at 316), and/or a number of plasma boost pulses 310 to determine when the switching of polarity is to occur. For example, in embodiments using a duration Z a timer circuit (or similar circuit) in the controller monitors an amount of time the waveform is welding in a first polarity (for example positive P) and compares that duration to a predetermined duration to determine if the actual duration is less than or more than the duration Z. If the duration of the first polarity portion is above the predetermined duration the controller 220 initiates the polarity switch at the next short detection event. The controller 220 does not necessarily initiate the polarity switch at the expiration of the predetermined duration Z but rather at the next short detection event that follows the duration Z. This ensures that the polarity switch occurs when the electrode 50 is in contact with the workpiece 60. By switching when the electrode 50 is in a shorted state there is no need for a high voltage level to quickly reestablish an arc, because the electrode and the workpiece 60 are in contact with each other. Because they are in contact there is no welding arc existing anyway, and thus the switching of polarity is easier to perform. Once the polarity is switched, at point 501, the timer circuit in the controller 220 begins counting the duration of the next polarity portion N and when that duration extends beyond the predetermined duration Z the controller 220 switches the polarity at the next detected shorting event. In an exemplary embodiment of the present invention, the predetermined duration of the polarity portions is at least 300 μs. In another exemplary embodiment of the present invention, the duration of the portions P/N is in the range of 300 μs to 600 ms. In an exemplary embodiment of the present invention, the duration of the portions P/N is in the range of 100 to 600 ms. In further exemplary embodiments, the duration of at least one of the portions P/N is no more than 1 second.

Further, in additional exemplary embodiments of the present invention, the controller 220 can monitor the shorting events t1 and/or the plasma boost pulses 310 of the respective portions P/N and when the number of events exceeds a predetermined number of detected events the polarity change is initiated at the next detected shorting event after the number of detected events existed the predetermined amount. For example, an embodiment of the present invention can change the polarity of the waveform 600 when the detected events (whether shorting events or plasma boosts) exceeds 20, such that when in the positive portion P and when the detected events exceeds 20 the controller 220 changes the polarity at the next short event 501. In exemplary embodiments of the present invention, the number of detected events by the controller is at least 5. In other exemplary embodiments, the number of detected events is at least 20, and in further embodiments is in the range of 5 to 40. In further exemplary embodiments, the number of detected positive polarity events is in the range of 5 to 40 followed by a series of negative events where the total duration of negative events is in the range of 100 to 600 ms. In such embodiments, the negative duration can be more focused on cooling the workpiece/weld puddle after the series of positive events, and thus the time duration in the negative polarity is the timing factor rather than the number of detected events in the negative polarity. In other embodiments the reverse is true, in that the positive polarity duration is defined by time, while the negative polarity portions are defined by the passing of a number of events.

In further exemplary embodiments of the present invention, the controller 220 can monitor both the duration Z and the detected events and trigger the polarity change at the first of either (1) the expiration of the duration Z, or (2) the exceeding of the number of detected events. For example, an embodiment may use the detection of events to drive the polarity change—such as shorting events—but if a number of shorting events do not occur, due to anomalies in welding, the expiration of the duration will trigger a change in polarity even though the number of shorting events has not exceeded the required amount.

By using this methodology, embodiments of the present invention can be used to carefully control the amount of heat input into the weld zone. By increasing the amount of time the waveform 600 is in a positive mode the heat will be increased, while if more time is spent in the negative mode the heat will be reduced. Embodiments of the present invention can allow for optimization of the heat input into the weld by adjusting the durations for the respective positive and negative portions. Further, embodiments of the present invention allow for more control over the weld puddle and can reduce the amount of force on the puddle. It is known that a positive polarity (when the electrode 50 is positive) provides an amount of force pushing at the puddle, and this force can be detrimental depending on the welding process. Thus, embodiments of the present invention allow for this force on the puddle to be balanced as needed by regulating the various durations of the positive and negative portions of the waveform 600.

Thus, the embodiments of the present can adjust the duration Z of the positive portions P of the waveform 600 to the duration Z of the negative portions N of the waveform 600 to adjust the amount of heat and force applied to the weld zone and puddle. For example, if the heat input is too high then the waveform 600 can be adjusted to reduce the durations of the positive portions P relative to the negative portions N, and vice versa. In some exemplary embodiments of the present invention, the durations of the negative and positive portions of the waveform 600 are the same, while in others the relative durations are different from each other. Further, in other exemplary embodiments the number of detected events for each of the positive and negative events is the same, while in other embodiments they can be different.

Thus, in various embodiments of the present invention the number of positive polarity current cycles 300 and negative polarity current cycles 320 are controlled to obtain the desired heat in the molten metal puddle of the welding operation.

Detection of the shorting events described above can occur in a number of ways, including those described herein. In exemplary embodiments of the present invention, the system 200 can monitor the voltage between the anode and cathode at the weld, where if the detected voltage drops below a threshold value the controller 220 determines that a shorting event is occurring. In an exemplary embodiment, this threshold voltage is in the range of 10 to 7 volts. In another exemplary embodiment the threshold is 10 volts or less. Thus, when the detected voltage drops below the threshold value (for example 10 volts) the controller determines that a shorting event is occurring and if the duration X has expired the controller 220 interrupts the normal short clearing operation and initiates a change in the current polarity as described herein. In an exemplary embodiment of the present invention, the controller causes whichever switch Q1 or Q2 is closed to open, such that both switches Q1 and Q2 are open. While both switches are open the current will drop quickly because of the snubbers 244. In exemplary embodiments, the controller 220 then waits for a predetermined incipient time delay before closing the other of the switches Q1 and Q2 to initiate the change in polarity. For example, in some embodiments the controller 220 closes the other of the switches Q1/Q2 after a delay in the range of 75 to 250 µs after the opening of the other of the switches Q1/Q2. This delay allows the current to sufficiently drop before the switch in polarity occurs.

In exemplary embodiments of the present invention, the incipient delay is set by observation of the welding process. If the delay is too short there can be excessive spatter when the droplet releases from the electrode 50 because of an explosive release of the droplet. However, if the time is too long the molten droplet will be consumed into the weld puddle and the electrode 50 may enter the weld puddle (as it is being fed by a source) which will cause an electrode stub that is difficult to clear. In exemplary embodiments the incipient delay is predetermined and set into the circuit. In some embodiments, the pinch duration (see e.g., 110 in FIGS. 2 and 3) is a reaction to how long the droplet needs to clear, or is based on the maximum pinch current reached (for example 500 amps max.). Then once the premonition circuit 70 fires, the system waits for an arc for a preset or predetermined time. If the arc occurs and is detected, the circuit will then go to peak current. However, if no arc is detected the circuit goes to the clearing ramp again, and then the plasma boost pulse is held for a present time and after that the tailout starts.

In exemplary embodiments of the present invention, the desired ratio between the positive and negative portion is obtained by an appropriate selector circuit in the controller 220. In embodiments of the invention, this ratio is determined based on at least some input parameters before welding so that a desired ratio can be utilized. For example, embodiments of the present invention can utilize at least one of a welding current setting, electrode diameter setting and wire feed speed setting, and the system 10/200 can utilize either a look-up table, algorithm or state-table type control to determine a desired positive/negative ratio for a given welding operation.

Figure 6:
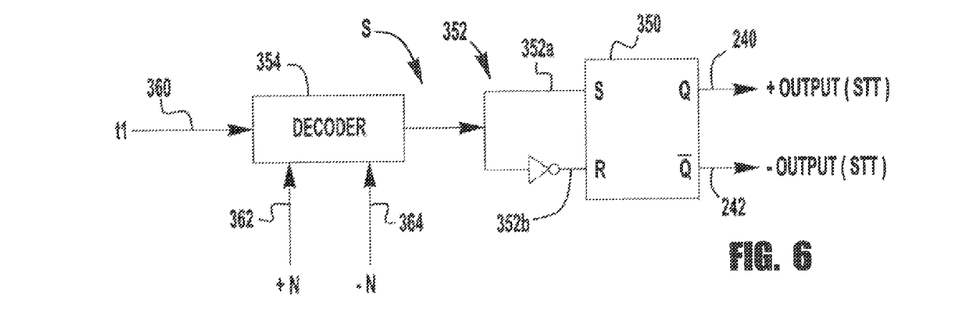
FIG. 6 illustrates a diagrammatical representation of an exemplary embodiment of a polarity selector used in an embodiment of the present invention.

An exemplary embodiment of the selector circuit is illustrated schematically in FIG. 6, where the selector circuit is a flip-flop 350, and is software implemented, having a non-inverted output 240 and an inverted output 242. The output is selected by anti-coincident circuit 352 having a set input line 352a and a reset input line 352b controlled by a digital decoder 354. Input 360 receives an input initiation pulse at time t1 when a cycle is started by a short circuit. The adjusting inputs 362, 364 of decoder 354 set the ratio of a number of positive current cycles at input 362 and the number of negative current cycles at input 364. Of course, in other embodiments, rather than detecting the number of events or cycles, the duration can be utilized above using a timer. By adjusting these two inputs, the ratio of positive current cycles 300 to negative current cycles 320 is selected to control the heat of the welding process. To change the heat, the ratio (of duration and/or detected events) is manipulated by changing the data at inputs 362 and 364.

Figure 7:
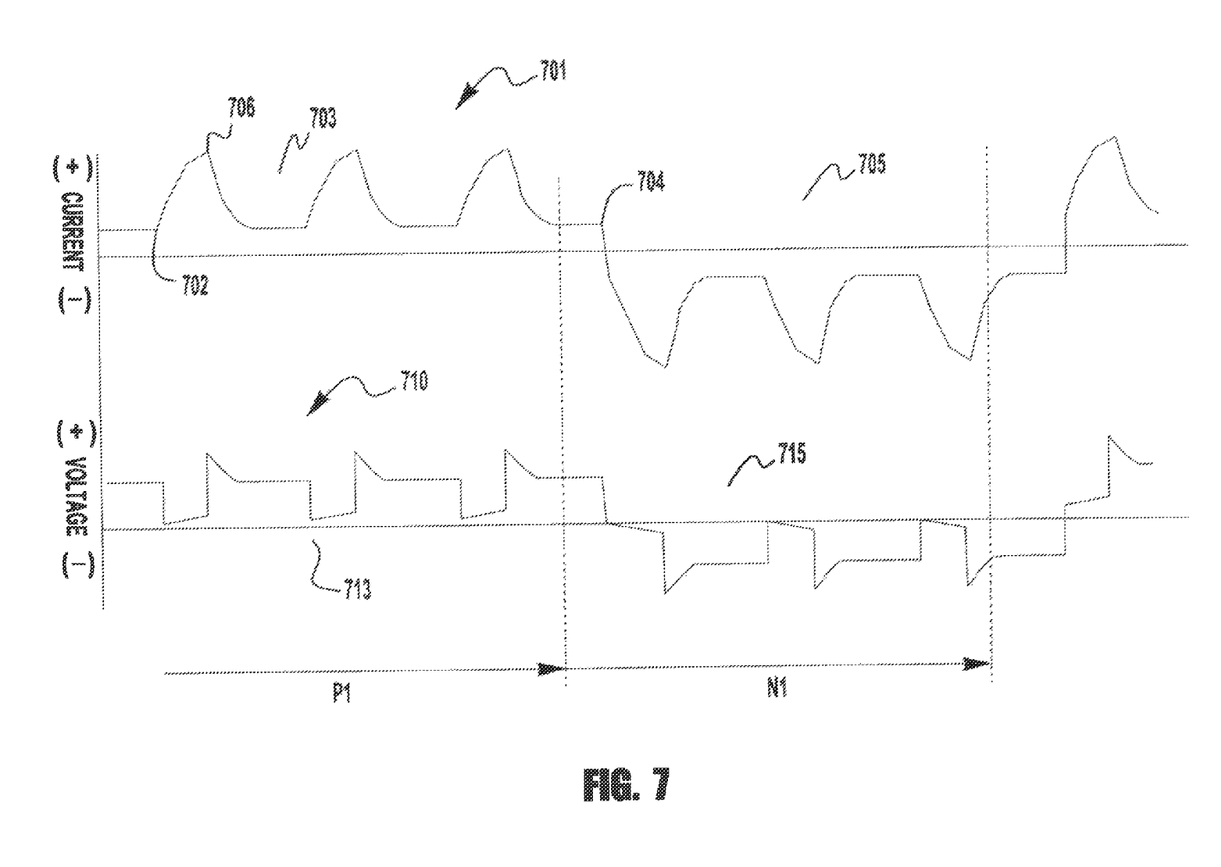
FIG. 7 illustrates a diagrammatical representation of a further waveform generated in accordance with exemplary embodiments of the present invention.

FIG. 7 depicts another exemplary welding waveform that can be utilized with embodiments of the present invention. Specifically, FIG. 7 depicts a short arc AC welding current waveform 701 and voltage waveform 710 utilizing an aspect of the present invention. As shown the current waveform 701 has a positive portion 703 and a negative portion 705, and the voltage waveform 710 also has a positive 713 and a negative 715 portion. As described above the positive portions are implemented for a duration P1, which can be determined either by time or by a number of detected events, and the negative portions also have a duration N1, which can be similarly determined. In the waveforms shown a short circuit begins at point 702, indicated by a current rise and voltage drop, and a short clearing pulse 706 is initiated. However, as described above, the first detected short 704 that occurs after the expiration of the duration P1 is not immediately cleared with a short clearing pulse, but rather the current switches polarity during the short 504 and after the polarity is switched a short clearing pulse is initiated, but in the opposite polarity. Then after the expiration of the negative duration N1 the polarity is reversed again at the next detected shorting event.

Figure 8:
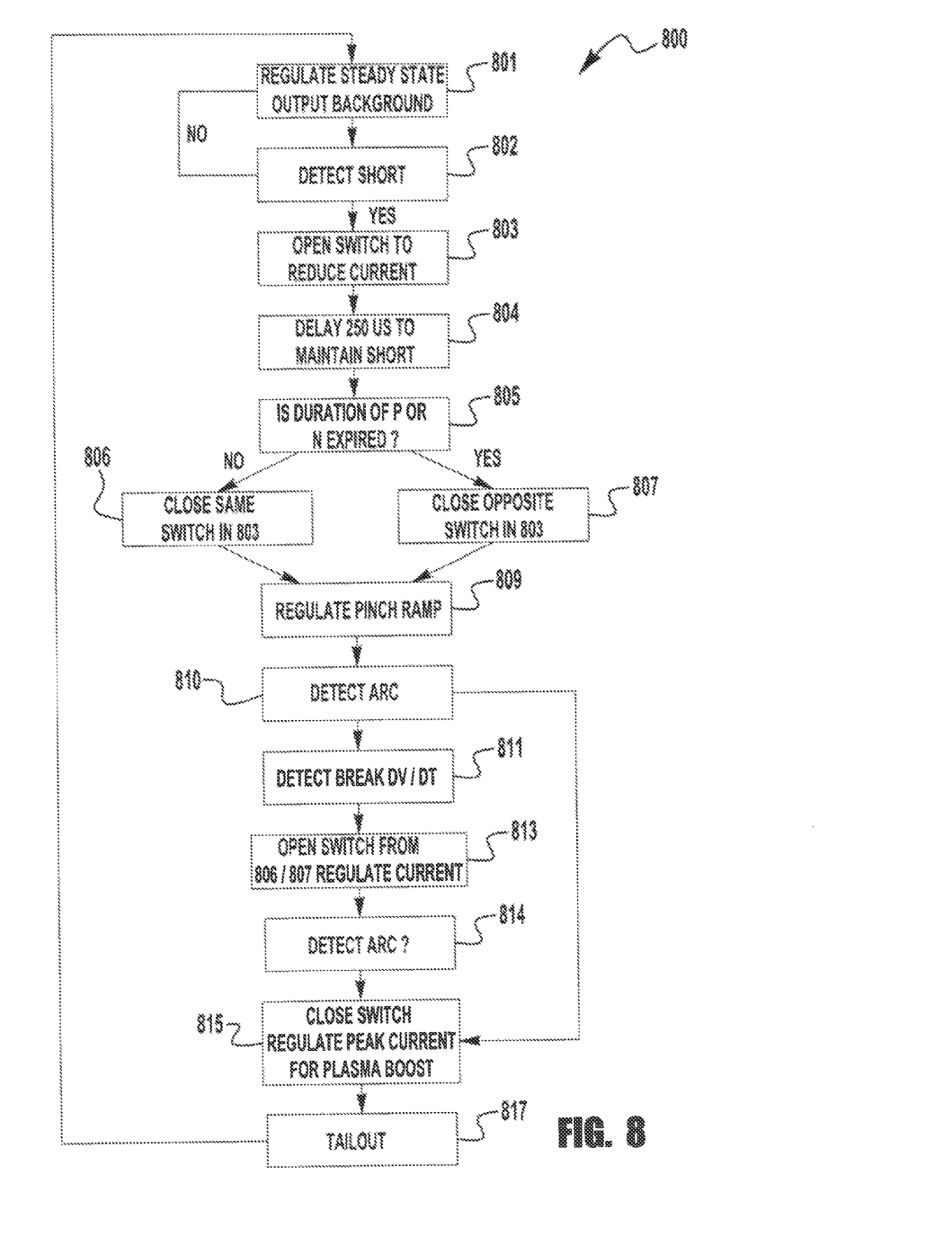
FIG. 8 illustrates a diagrammatical representation of an exemplary flow chart for embodiments of the present invention.

FIG. 8 is a representative flow diagram 800 for a method and system using embodiments of the present invention. The system 10/200 outputs a background current level 801 until a short circuit is detected at 802. When a short is detected the STT switch (either of switches Q1/Q2 in FIG. 4) is open to rapidly decrease the current 803. In an exemplary embodiment, the current is reduced to 45 amps. After the switch is opened a 250 μs delay is initiated (804) to allow the short to be maintained. Either after or during the delay, a determination is made as to whether or not the pending duration Z of a positive portion P or a negative portion N has expired 805. If the duration has expired then polarity is changed 807. In the embodiment shown in FIG. 4, the opposite of the switches Q1/Q2 is closed. If the duration has not expired then the switch from step 803 is closed 806. After the closing of the proper switch then the short clearing process begins with regulation of the pinch ramp at 809. If during regulation of the pinch ramp causes an arc to be detected (810) then the switch of step 806/807 is closed. However, if no arc is detected then the current is increased until the detection of the break of the short is detected at 811. When the break of the short is detected the switch from 806/807 is open to reduce the current so that the break does not explode 813. Then, when the arc is detected (814) the switch from steps 806/807 is closed and the peak current is regulated for a plasma boost 815. After the peak current is maintained for the desired time then the tailout is initiated at 817 and is maintained for the desired time, at which time the cycle is repeated. Of course, other modifications can to this flow chart/decision tree can be implemented without departing from the spirit or scope of the present invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A short circuit welding power supply, comprising:
a switching power supply which provides a welding current waveform to at least one workpiece to be welded, where said welding current waveform comprises a plurality of welding cycles and each of said welding cycles comprises at least an arc portion and a shorting portion which is initiated after the detection of a short circuit between an electrode and said at least one workpiece; and
a controller which controls an output of said switching power supply such that said welding current waveform comprises a plurality of first waveform portions and a plurality of second waveform portions,
wherein each of said first and second waveform portions of said welding current waveform comprises a plurality of said welding cycles,
wherein all of the current output by said switching power supply during said first portions has a first polarity, and all of the current output by said switching power supply during said second portions has a second polarity, which is opposite of said first polarity, and
wherein said controller switches the current output of said switching power supply between said first and second polarities only when a short circuit detection event is detected during welding,
and wherein said controller switches between said first and second polarities before said short detection event is cleared by the shorting portion of the cycle which immediately follows the short circuit detection event.

2. The power supply of claim 1, wherein at least one of said plurality of first waveform portions and said plurality of second waveform portions has a duration defined by a number of detected events, where said detected events are events occurring during welding cycles.

3. The power supply of claim 2, wherein said detected events are either of said arc portion or said shorting portion of said cycles.

4. The power supply of claim 2, wherein said duration is at least 5 of said detected events.

5. The power supply of claim 2, wherein said duration is in the range of 5 to 40 of said detected events.

6. The power supply of claim 1, wherein said first waveform portions have a first duration and said second waveform portions have a second duration, and said first duration is different from said second duration.

7. The power supply of claim 1, wherein said first waveform portions have a first duration and said second waveform portions have a second duration, and at least one of said first and second durations is at least 300 μs.

8. The power supply of claim 1, wherein said first waveform portions have a first duration and said second waveform portions have a second duration, and at least one of said first and second durations is in the range of 300 μs to 600 ms.

9. The power supply of claim 2, wherein the other of said at least one of said plurality of first waveform portions and said plurality of second waveform portions has a duration defined by time.

10. The power supply of claim 9, wherein said duration defined by said detected events is in the range of 5 to 40 detected events, and said duration defined by time is in the range of 100 to 600 ms.

11. A short circuit welding power supply, comprising:
a switching power supply which provides a welding current waveform to at least one workpiece to be welded, where said welding current waveform comprises a plurality of welding cycles and each of said welding cycles comprises at least a short circuit transfer portion and a plasma arc melting portion; and
a controller which controls an output of said switching power supply such that said welding current waveform comprises a plurality of first waveform portions and a plurality of second waveform portions,
wherein each of said first and second waveform portions of said welding current waveform comprises a plurality of said welding cycles,
wherein all of the current output by said switching power supply during said first portions has a first polarity, and all of the current output by said switching power supply during said second portions has a second polarity, which is opposite of said first polarity, and
wherein said controller switches the current output of said switching power supply between said first and second polarities when a short detection event is detected during welding, and
wherein said controller switches between said first and second polarities before a short circuit detected by said short detection event is cleared.

12. The power supply of claim 11, wherein at least one of said plurality of first waveform portions and said plurality of second waveform portions has a duration defined by a number of detected events, where said detected events are events occurring during welding cycles.

13. The power supply of claim 12, wherein said detected events are either of a short circuit detection event or a peak current event occurring during each of said welding cycles.

14. The power supply of claim 12, wherein said duration is at least 5 of said detected events.

15. The power supply of claim 12, wherein said duration is in the range of 5 to 40 of said detected events.

16. The power supply of claim 11, wherein said first waveform portions have a first duration and said second waveform portions have a second duration, and said first duration is different from said second duration.

17. The power supply of claim 11, wherein said first waveform portions have a first duration and said second waveform portions have a second duration, and at least one of said first and second durations is up to 1 second.

18. The power supply of claim 11, wherein said first waveform portions have a first duration and said second waveform portions have a second duration, and at least one of said first and second durations is in the range of 300 µs to 600 ms.

19. The power supply of claim 12, wherein the other of said at least one of said plurality of first waveform portions and said plurality of second waveform portions has a duration defined by time.

20. The power supply of claim 19, wherein said duration defined by said detected events is in the range of 5 to 40 detected events, and said duration defined by time is in the range of 100 to 600 ms.

21. The power supply of claim 11, wherein at least one of said first waveform portions and said second waveform portions has a duration defined by the shorter of a time or a number of detected events.

* * * * *